W. L. OWENS.
COÖRDINATOR.
APPLICATION FILED JUNE 11, 1919.
1,340,623.
Patented May 18, 1920.
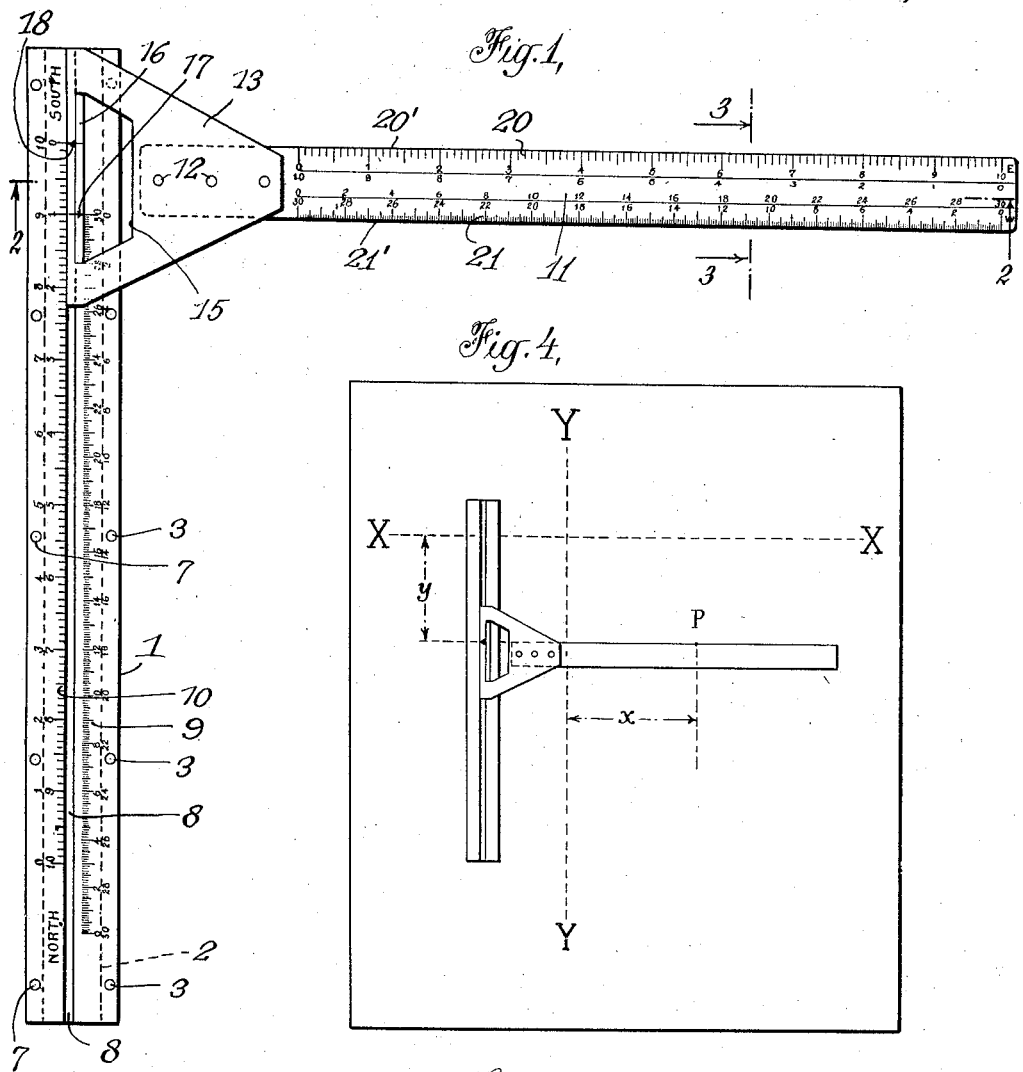
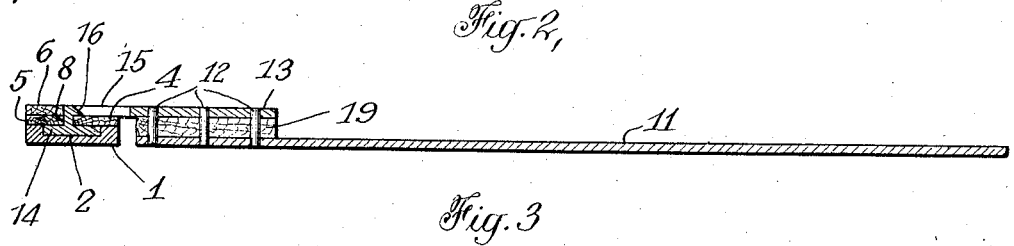
INVENTOR
W. L. Owens
BY
D. Anthony Usina
ATTORNEY

UNITED STATES PATENT OFFICE.

WILLIAM L. OWENS, OF SCOTTDALE, PENNSYLVANIA.

COÖRDINATOR.

1,340,623.   Specification of Letters Patent.   Patented May 18, 1920.

Application filed June 11, 1919. Serial No. 303,480.

*To all whom it may concern:*

Be it known that I, WILLIAM L. OWENS, a citizen of the United States, and resident of Scottdale, Pennsylvania, have invented certain new and useful Improvements in Coördinators, of which the following is a specification.

This invention relates to improvements in measuring instruments whereby the coördinate values of points on maps, diagrams and the like may be readily determined. The instrument comprises two blades or straight edges. One of these blades is guided on the other in such a way that it is accurately maintained at right angles thereto in its different adjusted positions.

The objects and advantages of the instrument will be apparent to mathematicians, engineers and others engaged in laying out maps, diagrams and plotting work by a method employing coördinate values.

Figure 1 is a plan view of the instrument;

Fig. 2 is a section taken on the line 2—2 of Fig. 1;

Fig. 3 is a detail section through one of the blades taken on the line 3—3 of Fig. 1;

Fig. 4 is a diagram illustrating one manner in which the instrument is used.

Referring to Figs. 1 and 2 the blade which is formed with a longitudinal groove 2 and has secured thereto by means of screws 3 a thin overhanging bar 4. In the opposite side of the blade 2 superposed bars 5 and 6 similarly overhang the groove 2 and are secured in place by screws 7. The bars 4, 5 and 6 are of such width that an open slot 8 is formed between their opposite edges, thereby forming the T-shaped slot as indicated in Fig. 2. Scales 9 and 10 are placed respectively on the bars 4 and 6 and are adapted for use in measuring the ordinates on a diagram.

The graduations of the bars 4 and 6 are laid out according to different scales so that one instrument serves for plotting or measuring distances according to a plurality of values. A second blade 11 is secured by means of screws 12 to a runner 13 which has a tongue 14 integrally formed thereon and which is adapted to traverse the groove 2 formed in the blade 1. This runner is cut away to provide an opening 15 so that the markings on the scale 9 will be visible, and one edge of this opening is beveled off at 16 and has an indicating mark 17 which is adapted to be lined up with the graduations on the scale 9 to facilitate the reading of the values being plotted or determined. A similar mark 18 is formed on the top surface at the edge of the runner to facilitate the reading of the values on the scale 10.

A spacer 19 is interposed between the underside of the runner 13 and the upper face of the blade 11 so as to bring the underside of said blade into the same plane with the underside of the blade 1 thereby enabling the instrument to be conveniently moved around on top of maps, drawings, diagrams or the like. It will be noted that the top edge of the bar 6 is flush with the top edge of the runner 13 thereby enabling the plotter to accurately register the marker 18 with the desired graduation on the scale 10. Likewise the beveled edge 16 permits of accurate adjustment between the marker 17 and the scale 9.

The graduations 20 and 21 shown on the blade 11 are laid out respectively to the same scale as the graduations 10 and 9 formed on the blade 1 and it is therefore possible to plot rectangular coördinate values of different points by measuring respectively the abscissæ on the scales 20 or 21 and the ordinates on the scales 10 or 9. It is to be noted that the zero position on the scale 10 is in line with the upper edge 20′ of the blade 11 and likewise that the zero position on the scale 9 is in line with the edge 21′ of the blade 11. By way of illustrating the use of the instrument in Fig. 4, I have delineated a simple diagram showing the way of plotting a point P, the distance of which is known from the axis X—X and the axis Y—Y. The instrument is first set as shown in Fig. 1 with the marker 18 in line with the zero on the scale 10, it being understood that in the location being plotted I am going to utilize values indicated respectively by the scales 10 and 20.

The blade 11 is first brought into register with the line X—X and with one hand holding the blade 1 in place, the runner 13 is moved with the other hand a distance $y$ to the position shown in Fig. 4 equal to the ordinate value being plotted, then by measuring the distance $x$ from zero corresponding to the abscissa the point P will be established. From this it is clear that the reverse operation can be readily accomplished, that is to say, if I have given the point P I can readily establish the values of the abscissa and ordinate of said point with respect to given axes X—X and Y—Y.

While I have described with great particularity in detail the specific embodiment of the invention herein shown, it is not to be construed that I am limited thereto as changes may be made by those skilled in the art without departing from the invention as defined in the following claims.

What I claim is:—

1. A measuring instrument comprising a blade having a guide groove formed therein, a scale on said blade, a runner having an inverted T-shaped tongue which traverses said groove, bars secured to said blade and overhanging each side of said guide groove adapted to co-act with the head of said tongue to permit only a longitudinal relative movement between said runner and said blade, and a second blade having a scale thereon rigidly secured to said runner.

2. A measuring instrument comprising a blade having an undercut guide groove, scales on said blade, a runner adapted to traverse said undercut guide groove, said runner having a portion thereof cut away to expose the graduations on one of the scales on the blade and a second blade having at least one set of graduations thereon secured to said runner.

In witness whereof, I have hereunto signed my name.

WILLIAM L. OWENS.